UNITED STATES PATENT OFFICE.

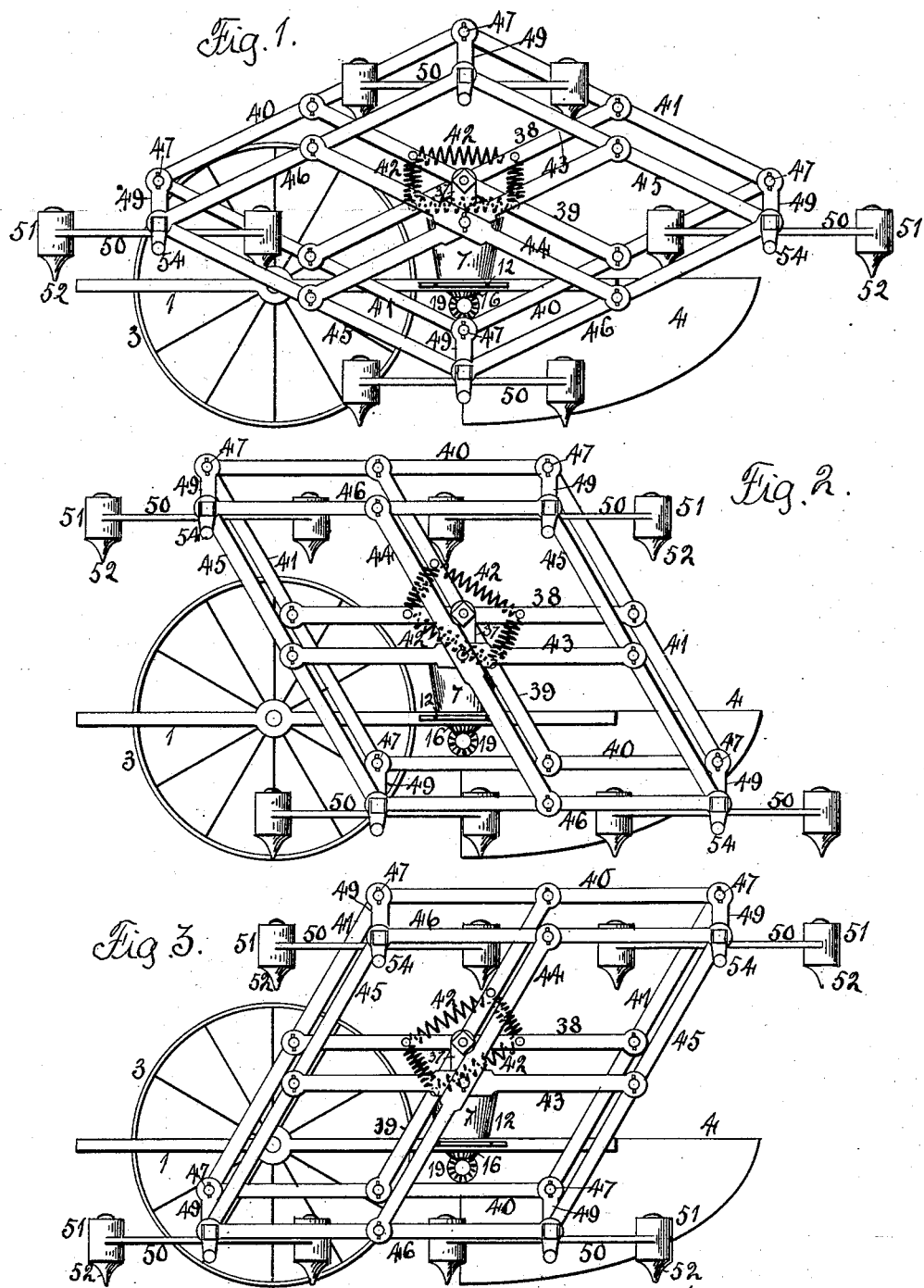

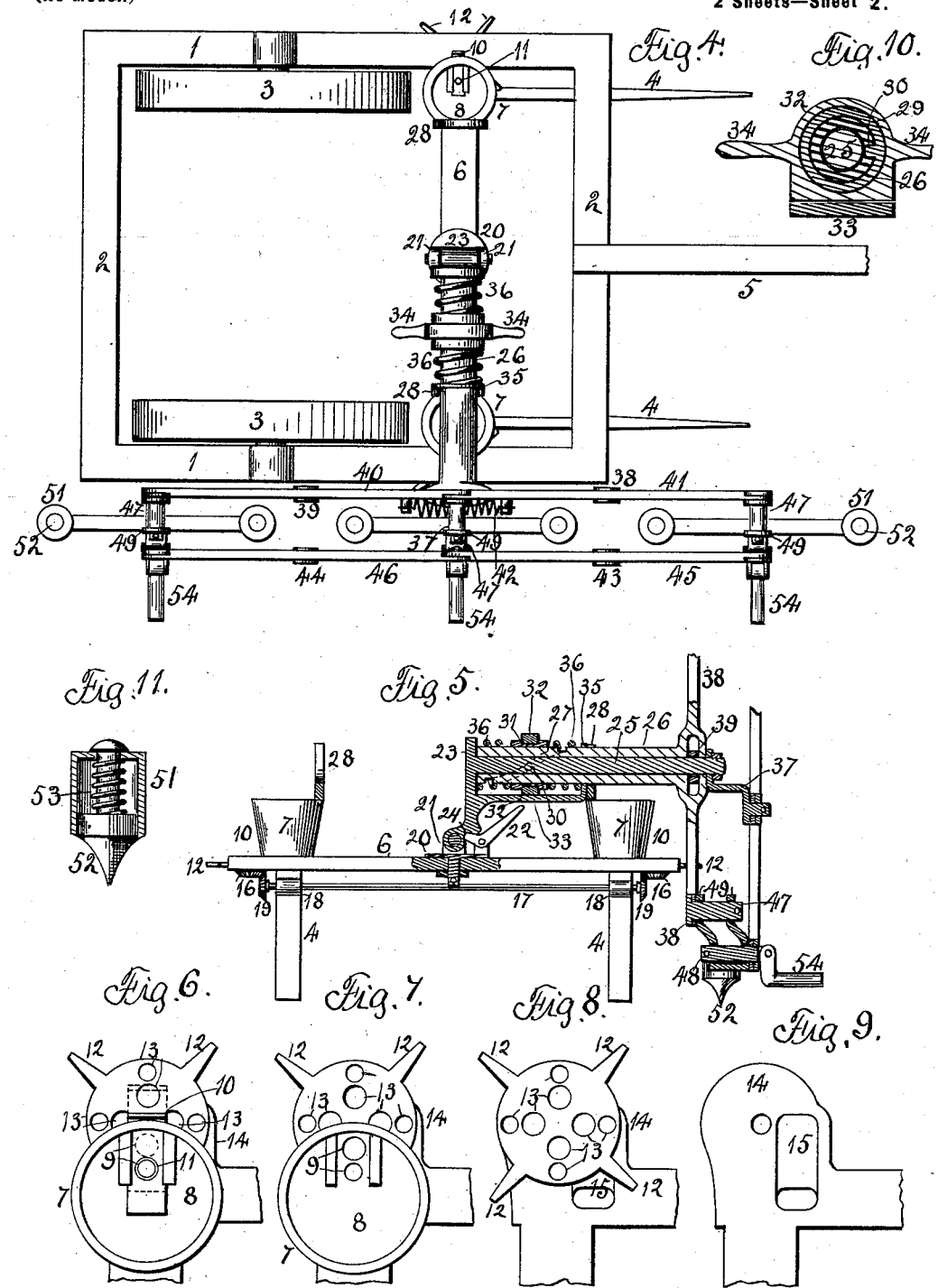

EMIL G. JOHANSON, OF ROCKFORD, ILLINOIS, ASSIGNOR TO C. PONTUS HAEGG, OF SAME PLACE.

CORN-PLANTER.

SPECIFICATION forming part of Letters Patent No. 655,240, dated August 7, 1900.

Application filed November 28, 1899. Serial No. 738,580. (No model.)

*To all whom it may concern:*

Be it known that I, EMIL G. JOHANSON, a citizen of the United States, residing at Rockford, in the county of Winnebago and State of Illinois, have invented certain new and useful Improvements in Corn-Planters, of which the following is a specification.

The object of this invention is to construct a corn-planter in which the checking is done by a stepping device moving over the ground, and which is transferable to either side of the planter.

In the accompanying drawings, Figures 1, 2, and 3 are side elevations in which the stepping device is shown in different positions. Fig. 4 is a plan view. Fig. 5 is a vertical section through the center of the stepping device. Figs. 6, 7, 8, and 9 are representations of seedbox and seed-dropping devices. Fig. 10 is a transverse section of the shifting means for stepping device. Fig. 11 is a vertical section of one of the feet of the stepping device.

The main frame consists of the side bars 1 and end bars 2. The side bars support carrying-wheels 3. Runners 4 are supported by one of the end bars 2. A tongue 5 is connected to the same end bar. A cross-bar 6 is supported by the side bars 1 and seedboxes are supported by this cross-bar. The bottoms of the seedboxes have a series of openings 9 of different diameters, and a slide 10, provided with an opening 11, is located over the openings in the bottom of the seedboxes. Beneath the slide is pivoted a star-wheel provided with four arms 12 and four series of holes 13, each series comprising holes of different diameters. The arms 12 of the star-wheel project beyond the outer edge of the side bars of the main frame, and as the star-wheels are rotated one series of the openings therein will underlie the openings in the bottom of the seedbox and the slide 10 will be moved so that its opening will coincide with one of the openings in the bottom of the seedbox. Corn placed in the seedbox will fill one of the openings in the star-wheel, and as the star-wheel is revolved the corn will be carried beneath the bottom of the seedbox and rest upon plate 14 beneath the star-wheel until moved over the opening 15, where it is discharged into the heel of the runner. This operation is repeated at every movement of the star-wheel, and by means of the slide any one of the openings 9 in the bottom of the seedbox may be exposed, and as the openings are of different diameters a greater or less number of kernels of corn will be carried by the star-wheel.

To the lower ends of the pivotal supports of the star-wheels are secured miter gear-wheels 16. A shaft 17 is supported in suitable bearings 18 and has miter-wheels 19 secured to its ends, which mesh with the miter-wheels 16, so that a movement to one of the star-wheels will be imparted to the other star-wheel in the opposite direction in order that corn may be dropped by both star-wheels simultaneously.

To the cross-bar 6 is pivoted a plate 20, having uprising ears 21 and a pivoted lever 22. Between the ears 21 is pivoted an arm 23, its lower end provided with a notch 24 and its upper end supporting a stationary shaft 25. Around this stationary shaft 25 is located a tube 26, having a spiral groove 27 in its outer face and extending in the lengthwise direction of the tube. This tube rests in a fork 28, rising from the upper face of the seedbox. A collar 29 surrounds the tube 26, having a pin 30 located in the spiral groove 27, and a groove 31 is formed in its outer face. A sliding collar 32 is located in the groove 31, its under face being flattened and resting upon the horizontal bar 33, extending from the vertical arm 23. Handles 34 extend from the collar 32. The horizontal bar 33 has an uprising ear 35, which supports the tube and shaft about midway of their length. Springs 36 are located between the collar and the arm 23 and uprising ear 35, which tends to hold the collar midway between the arm and ear, and when the tube is revolved the collar will revolve with it by reason of the pin located in the spiral groove. By a movement in the lengthwise direction of one of the handles 34 the collar 32 will be clamped in connection with the collar 26, thereby holding it from revolving, and by a further movement of the handle in the same direction both collars will be moved bodily in that direction and are held from revolving by the flat surface of the collar 32 resting upon the horizontal bar 33. This bodily movement of the collars will revolve the tube a partial revolution by the pin engaging the spiral groove.

By moving the collars in the opposite direction the tube will be partially revolved in the opposite direction. By pressing down on the lever 22 the projection thereof located in the notch 24 of the arm 23 will move the arm 23 on its pivotal connection with the plate 20 and raises it sufficiently to clear the forks 28, so that the tube can be turned into engagement with the fork of the other seed-box. The object in partially rotating the tube will be explained presently.

To the free end of the stationary shaft 25 is secured an angle-iron 37, having its lower end perforated. To the outer end of the tube 26 is secured an arm 38 and moved therewith. Upon the shaft 25, between the end of the tube 26 and the angle-iron, is pivoted an arm 39, and to the free ends of this arm are pivoted links 40 and to the free ends of the arm 38 are pivoted links 41. The ends of the links are pivoted together, forming an inner frame. The arms 38 and 39 of this inner frame are connected by spiral springs 42.

An outer frame is formed by the arms 43 and 44, pivoted to the lower end of the angle-iron 37. The ends of the arms are pivotally connected by links 45 and 46 and the links pivotally connected at their ends. The pivotal points of the links of the inner frame support pins 47 and the pivotal points of the links of the outer frame support pins 48, and the pin of each frame supports a swinging frame composed of the arms 49, thereby forming a pivotal connection between the inner and outer frame. Each swinging frame supports a bar 50, to the ends of which are feet 51, having a center plunger 52, held yieldingly extended by a spring 53. To the outer ends of the pins 48 are pivoted markers 54. By pivoting the outer frame on a center below the center of the inner frame, the swinging frame will always be held in a vertical position and the bars 50, supporting the feet, will always stand in a horizontal position. As the planter is drawn over the ground the feet will come in contact with the ground and the feet supported at one corner of the frames will remain on the ground until the feet of the next bar in advance comes in contact with the ground, imparting a step movement to the frames, and as the feet come in contact with the ground the markers 54 will leave an imprint in the ground as a guide. As the frames revolve the arms 38 and 39 of the inner frame will alternately engage one of the arms 12 of the star-wheels and impart an intermittent rotary movement thereto, which will drop the corn, as before described. By the partial rotary movement imparted to the tube 26 the frames are moved forward or backward to set the planter at the commencement of a row, and by the pivotal connection of the arm 23 with the cross-bar 6 the frames can be turned to the opposite side of the planter and operate the star-wheel at that side.

I claim as my invention—

1. In a corn-planter, the combination of a supporting-frame and wheels, seedboxes supported by the frame, two frames of rectangular form having a pivotal connection, and rotatable on different centers, feet supported at the point of connection between the frames and held in a horizontal position, the frames imparting motion to the seed-dropping devices.

2. In a corn-planter, the combination of a supporting-frame and wheels, seedboxes supported by the frame, two frames of rectangular form having a pivotal connection and rotatable on different centers, feet and markers supported at the point of connection between the frames, the feet held in a horizontal position, the frames imparting motion to the seed-dropping devices.

3. In a corn-planter, the combination of a supporting-frame and wheels, seedboxes supported by the frame, two frames of rectangular form having a pivotal connection and rotatable on different centers, springs connecting the arms of the frames, feet supported by the frames and held in a horizontal position, the frames imparting motion to the seed-dropping devices.

4. In a corn-planter, the combination of a supporting-frame and wheels, a stationary shaft, a tube surrounding the shaft having a pivotal connection with the main frame, the shaft having a downward extension, two rotatable frames pivotally connected and supporting feet, one frame supported by the tube, and movable therewith, the other frame supported by the extension, the frame supported by the tube adapted to operate the seed-dropping devices.

5. In a corn-planter, the combination of a main frame and supporting-wheels, a series of feet adapted to alternately engage the ground and imparting movement to the seed-dropping devices, and movable bodily to either side of the planter, the feet held in a horizontal position.

6. In a corn-planter, the combination of a main frame and supporting-wheels, a series of feet adapted to alternately engage the ground and imparting movement to the seed-dropping devices, and movable bodily to either side of the planter, the feet held in a horizontal position and means for adjusting the feet to properly set them.

EMIL G. JOHANSON.

Witnesses:
A. O. BEHEL,
E. BEHEL.